UNITED STATES PATENT OFFICE.

FRANCIS X. GOVERS, OF OWEGO, NEW YORK.

PAINT REMOVER AND PROCESS OF MAKING THE SAME.

No. 868,920.

Specification of Letters Patent.

Patented Oct. 22, 1907.

Application filed August 16, 1907. Serial No. 388,926.

*To all whom it may concern:*

Be it known that I, FRANCIS X. GOVERS, a citizen of the United States, residing at Owego, in the county of Tioga and State of New York, have invented certain new and useful Improvements in Paint-Removers and Processes of Making the Same; and I hereby declare the following to be a full, clear, and exact description of the same, such as will enable others skilled in the art to which it appertains to make and use the same.

This invention relates to paint removers and processes of making the same and consists in a paint and varnish remover composed of a phenol, preferably cresylic acid, and a plurality of volatile solvents of differing chemical character, said plurality preferably comprising an aromatic hydrocarbon and one of the lower alcohols, said remover being colloided by casein dissolved therein with the aid of a limited amount of a concentrated liquid fatty acid; and also in a process of preparing such removers comprising the admixing of a phenol with a relatively large amount of a mixture of a plurality of volatile solvents and the solution of casein in the mixture so formed by the aid of a little liquid fatty acid; all as more fully hereinafter set forth and as claimed.

The phenols have good softening and disintegrating powers for paint and varnish constituents and have also properties which render them suitable for disinfecting old and foul walls and furniture from which paint or varnish must be removed, but alone they are hardly suitable for practical paint or varnish removers as they form liquids rather too thinly fluid to be localized on a wall and are corrosive to the hands of the operator. Nor are they applicable to all paints and varnishes or capable of acting upon all the constituents of any one paint or varnish. Phenols are preferably, therefore, used in combination with other solvents of differing chemical character to produce removers of general applicability and capable of attacking all constituents of any one paint or varnish. Preferably, also, a plurality of such other solvents differing among themselves in chemical character, is employed. Further, since these other solvents, like the phenols themselves, are generally rather thinly fluid, for practical purposes it is better to colloid the mixture somewhat by a dissolved colloid body, such as casein. For this purpose with mixtures containing phenols casein has the great additional practical advantage that being proteid in nature it restrains the corrosive action of such phenols upon the hands of the user. Other proteids, like glue and gelatin may be similarly used and are similarly advantageous. For the colloiding effect *per se*, however, non-proteid colloids like pyroxylin and gutta percha may be used. But in general it is desirable to use at least some proteid in the mixture as a colloiding agent; and this proteid is preferably casein or a similar colloid proteid. Such a colloided remover is thick and of little mobility, and for this reason and for the reason that the colloided phenols, in themselves not very volatile help to restrain the volatility of the volatile solvents with which they are incorporated, in use compound removers made as stated display little tendency to evaporation even when the remover is, as it must be in practice, spread out in comparatively thin layers upon coated surfaces.

I have discovered that by employing certain specific ways of putting the described bodies together I can produce new removers of great general applicability. I find that by first incorporating a phenol, preferably cresol, with an aromatic hydrocarbon, preferably benzol in the present embodiment of my invention though toluol or xylol may also be used, and with one of the lower alcohols, such as methyl or ethyl alcohol, but preferably methyl alcohol, employing about equal quantities of phenol, hydrocarbons and alcohol, I obtain a clear solution of good paint softening and disintegrating powers. This solution however, *per se*, is not well adapted to serve as a remover, being too mobile to permit convenient application in layers of efficient thickness on vertical or inclined walls.

While it is possible to colloid the stated solution with such bodies as pyroxylin or gutta percha, it is not practicable to colloid it directly with my preferred colloid bodies, the proteids such as casein. The solution of itself will not dissolve much casein, or at least enough to be of practical value, in any reasonable time, nor will it even soften casein to any extent. But I have found that it acquires the power of dissolving casein upon being acidulated with a relatively small amount of a concentrated liquid fatty acid; such as acetic or formic acid.

Upon acidulating the solution and dissolving casein or other suitable colloid, but preferably casein, therein, I obtain thick, comparatively clear and homogeneous compositions of great practical value as paint and varnish removers since they are not liable to much loss by evaporation and readily attack and disintegrate paint or varnish. By reason of their thick consistency, which is preferably somewhat greater than the consistency of castor oil, they are readily applied with an ordinary paint brush in much the same manner as paint.

In a companion application, Serial number 387831 filed August 9, 1907, I have described and claimed removers of the present type, claiming more specifically removers in which the acidulating agent is formic acid. But for some purposes, I find that acetic acid is rather better adapted. When using toluol as the aromatic hydrocarbon, I find that I can work in rather more of this solvent without interfering with the solution of the casein when the acidulating agent is formic acid than when it is acetic acid, while the converse is true in the case of benzol. As it is ordinarily desirable to have as much volatile solvent as possible, in removers containing toluol I therefore usually prefer to employ formic acid while with removers containing benzol I prefer to employ acetic acid. Furthermore, I find that the removers acidulated with acetic acid are rather better for lead paints since acetate of lead is more soluble in alcohol than is the formate, and in removers intended to treat old white lead paint I therefore rather prefer to acidulate the compound solvent with acetic acid.

As stated, the phenol used is preferably ordinary cresylic acid, though carbolic acid may also be employed. In practice, I mix the phenol with about the same quantity of an aromatic hydrocarbon, in this case preferably benzol, though toluol or xylol may be used, and then add about the same amount of alcohol. The clear solution so formed, in spite of the solvent power of cresylic acid for casein, dissolves relatively little of that substance in any convenient time; this being probably due to the restraining action of the benzol and alcohol. But on adding a few per cent. of a concentrated acetic acid, say 5 per cent. it becomes a relatively good solvent for relatively large amounts of colloids such as casein. Ten per cent. of casein dissolved in the acidulated mixture will give a remover of a consistency rather greater than that of castor oil. As the lower alcohol employed, I preferably use methyl alcohol which may be of any of the stronger commercial grades. Ordinary wood spirit is perfectly suitable.

As a practical example of my remover and of the process of making the same, I may adduce the following: Mix about 1600 grams of ordinary commercial cresylic acid or cresol with 1500 to 1600 grams of commercial benzol and the same quantity of commercial wood alcohol. The mixture forms a clear solution. Upon now adding about half a kilo of commercial dried casein, preferably ground to about 120 mesh, it will be found not to dissolve to any extent, at least at first. But upon adding a small quantity of a concentrated acetic acid, say about 5 per cent., or, in this case, about 250 grams, the casein will be found to go into solution, producing a thick transparent or translucent mass of a consistency somewhat greater than that of castor oil. The stated amount of casein is about 10 per cent. of the whole mass. The solution is facilitated by warming or by violent stirring; the latter, because of the thick consistency, being best performed by some commercial form of stirring apparatus. If the remover is desired somewhat thicker a little more casein may be employed; if somewhat thinner, a little less. But for most purposes, 10 per cent. will give about the right consistency.

Glue or other proteids may be used to replace part or all of the casein, but I prefer casein. Part or all the cresylic acid may be replaced by carbolic acid, but I prefer the former. While a portion of the volatile solvents, alcohol, or benzol, may be employed after the solution of the casein, I prefer to mix the total quantity of such solvents with the phenol before attempting to dissolve the casein. The liquid fatty acid may be added before the casein is added, but I prefer to add the casein first as the operation is rather smoother.

The remover produced is substantially a mixture of about equal parts of phenol, such as cresol, an aromatic hydrocarbon, such as benzol, and a lower alcohol, such as methyl alcohol, colloided and given consistence by the presence of about 10 per cent. of colloid, calculated on the total mass, with enough acetic acid to hold the colloid in solution, say about 5 per cent. of the total mass. These proportions may of course be varied a little one way or another but those stated are practical and satisfactory, producing a remover of good paint softening and disintegrating power which can be easily applied with a paint brush. Because of the presence of the phenol, the mixture has good disinfectant powers, rendering it eminently suitable for treating old coated surfaces, while the proteid present restrains the action of the phenol upon the hands of the user.

The presence of acetone in the wood alcohol employed is not injurious for the present purposes.

What I claim is:—

1. The process of producing a paint and varnish remover which comprises mixing a phenol with one of the lower alcohols and with an aromatic hydrocarbon and in then dissolving casein in the mixture with the aid of a small amount of acetic acid.

2. The process of producing a paint and varnish remover which comprises mixing cresylic acid with an aromatic hydrocarbon and with one of the lower alcohols, and in then dissolving casein in the mixture with the aid of a small amount of acetic acid.

3. The process of producing a paint and varnish remover which comprises mixing cresylic acid with benzol and methyl alcohol, and in then dissolving casein in the mixture with the aid of a small amount of acetic acid.

4. The process of producing a paint and varnish remover which comprises mixing a phenol with an aromatic hydrocarbon and a lower alcohol, mixing casein with the mixture, acidulating said mixture with a small amount of acetic acid to cause a solution of the casein, and dissolving the casein.

5. As a paint and varnish remover, a thick mixture of a phenol, an aromatic hydrocarbon and one of the lower alcohols in about equal proportions, said remover containing about 10 per cent. of dissolved casein as a colloiding agent and a little acetic acid.

6. As a paint and varnish remover, a thick mixture of cresylic acid, an aromatic hydrocarbon and one of the lower alcohols in about equal proportions, said remover containing about 10 per cent. of dissolved casein as a colloiding agent and a little acetic acid.

7. As a paint and varnish remover, a thick mixture of cresylic acid, benzol and one of the lower alcohols in about equal proportions, said remover containing about 10 per cent. of dissolved casein as a colloiding agent and a little acetic acid.

8. As a paint and varnish remover, a thick mixture of cresylic acid, benzol and methyl alcohol in about equal proportions, said remover containing about 10 per cent. of dissolved casein as a colloiding agent and a little acetic acid.

In testimony whereof, I affix my signature in the presence of two subscribing witnesses.

FRANCIS X. GOVERS.

Witnesses:
H. M. MARBLE,
K. G. LEARD.